June 28, 1949.   F. T. HAGUE   2,474,477
PULVERIZED FUEL DISTRIBUTOR FOR BURNER NOZZLES
Filed Dec. 6, 1946   3 Sheets-Sheet 1

FIG. I.

INVENTOR
FLOYD T. HAGUE
BY
ATTORNEY

June 28, 1949. F. T. HAGUE 2,474,477
PULVERIZED FUEL DISTRIBUTOR FOR BURNER NOZZLES
Filed Dec. 6, 1946 3 Sheets-Sheet 3

WITNESSES:

INVENTOR
FLOYD T. HAGUE
BY
ATTORNEY

Patented June 28, 1949

2,474,477

UNITED STATES PATENT OFFICE 2,474,477

PULVERIZED FUEL DISTRIBUTOR FOR BURNER NOZZLES

Floyd T. Hague, Drexel Hill, Pa., assignor to Westinghouse Electric Corporation, East Pittsburgh, Pa., a corporation of Pennsylvania Application December 6, 1946, Serial No. 714,557

1 Claim. (Cl. 302—28)

The invention relates to means for supplying a mixture of fuel and air to a plurality of nozzles and it has for an object to provide apparatus of this character utilizing an impeller to promote uniformity of the mixture and to secure distribution thereof in an equalized manner to the nozzles.

A further object of the invention is to provide for division of the stream of pulverized fuel and air mixture into a plurality of equal parts supplied to a plurality of nozzles with maintenance of uniformity of the mixture.

The division of a coal-in-air stream into two or more smaller streams of equal size is generally recognized as a difficult operation for the reason that the coal may not be uniformly distributed over the cross section of the air stream, in consequence of which stationary partitioning or dividing means do not given uniform or accurate division. Accordingly, it is a further object of the invention to meet this problem by means of a centrifugal impeller or fan which operates to induce the flow of a mixture of coal and air thereto at high velocity and which discharges the mixture peripherally through circumferentially-distributed outlets and passages to nozzles.

A further object of the invention is to provide an arrangement of the above character wherein the vane or impeller is designed to give a relatively high inlet velocity to assure of more uniform distribution of the in-coming fuel and air and to discharge the mixture peripherally therefrom into an annular equalizing chamber provided with circumferentially-distributed outlets connected by supply passages to nozzles.

In general, the invention has for a further object to provide a relatively small and compact divider for a coal and air stream and wherein the divider has a high speed runner or impeller operating to induce a high in-coming velocity of the mixture of fuel and air and which has a diameter insufficient for the number of mixture outlets desired.

The foregoing and other objects are effected by the invention as will be apparent from the following description and claims taken in connection with the accompanying drawings, forming a part of this application, in which:

Fig. 5 is a detail sectional view of the divider showing one of the distributing pipes.

Figure 1:
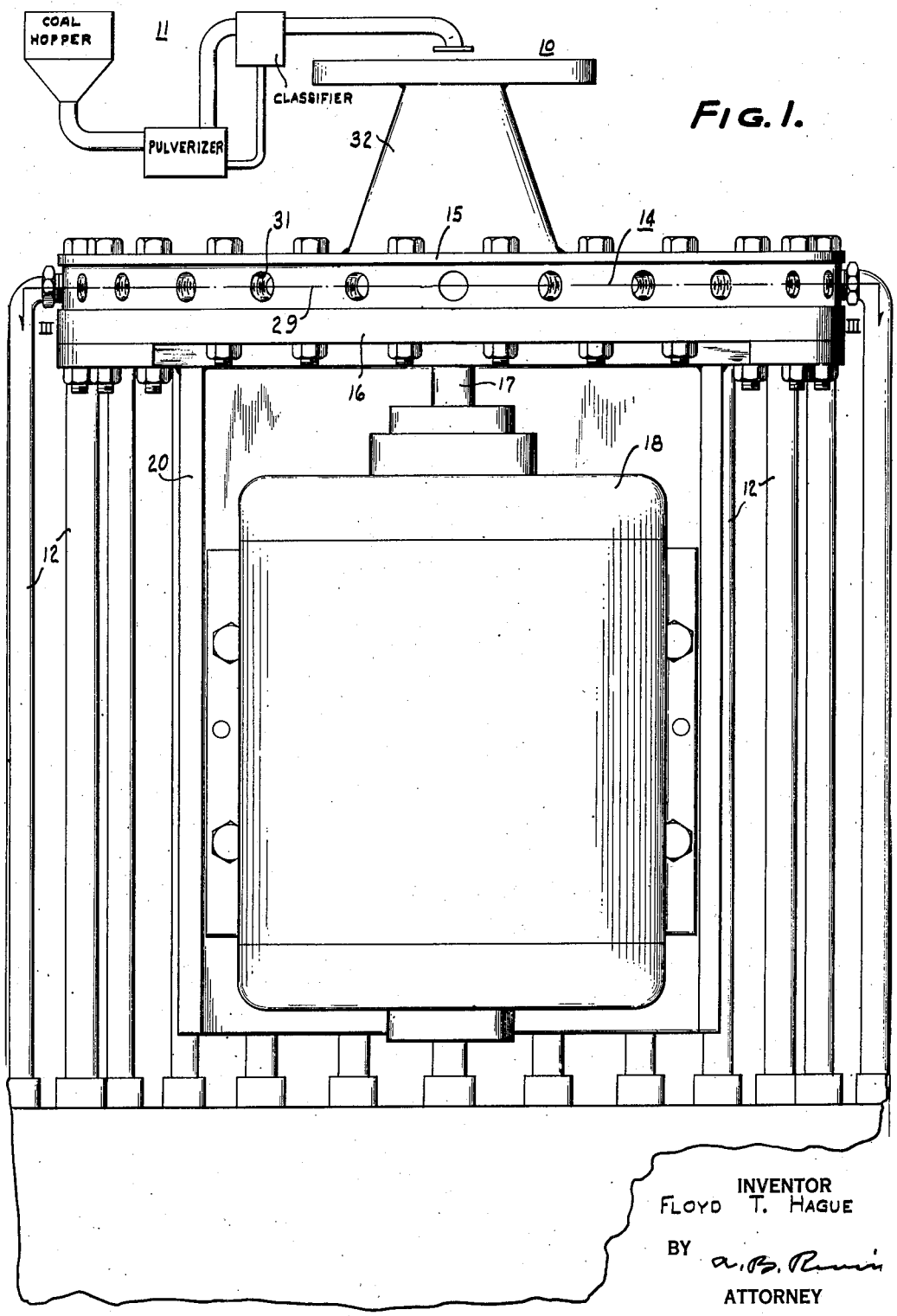
Fig. 1 is a schematic diagram showing the divider and associated apparatus.
Figure 2:
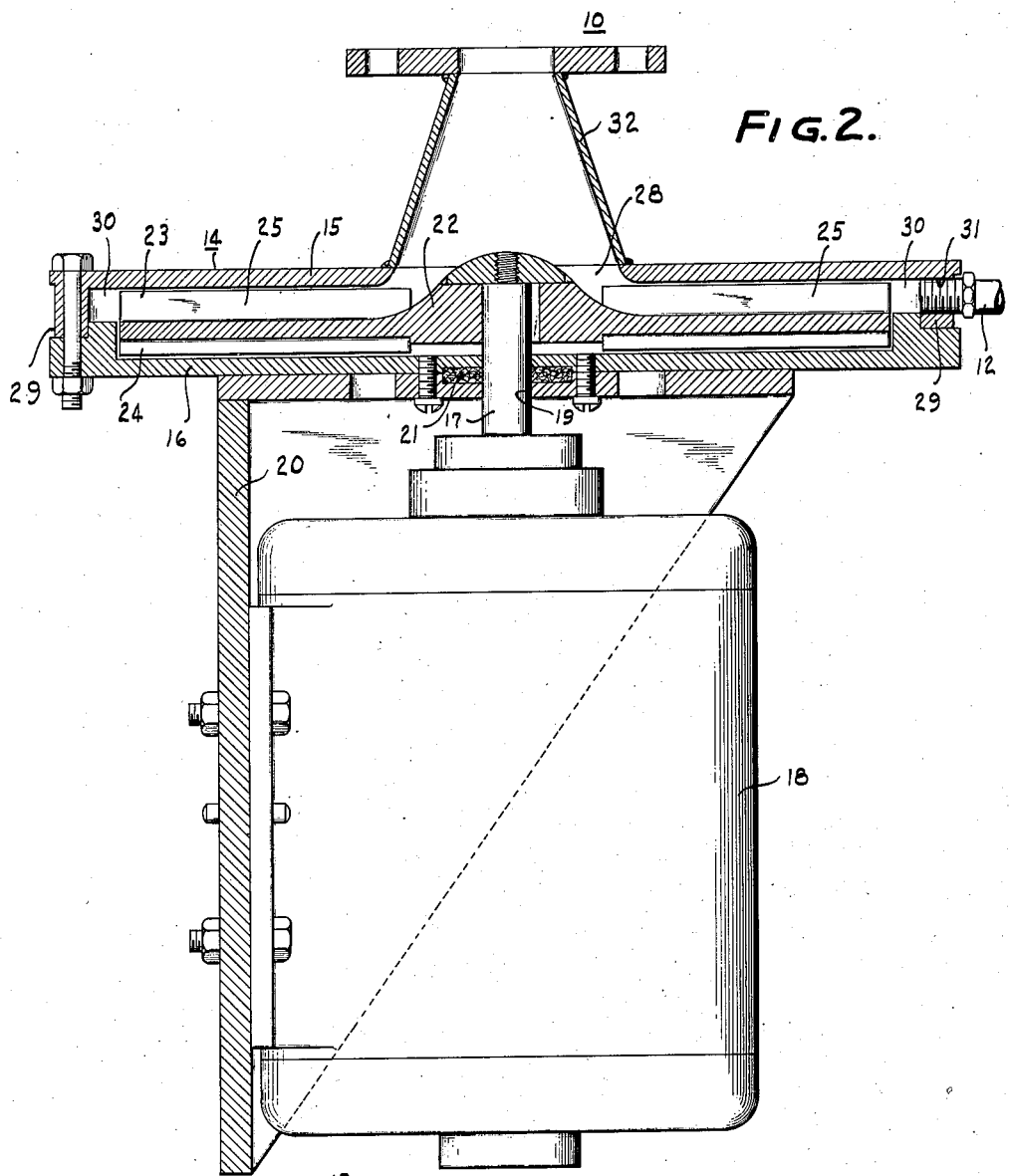
Fig. 2 is a sectional view of the impeller divider.
Figure 3:
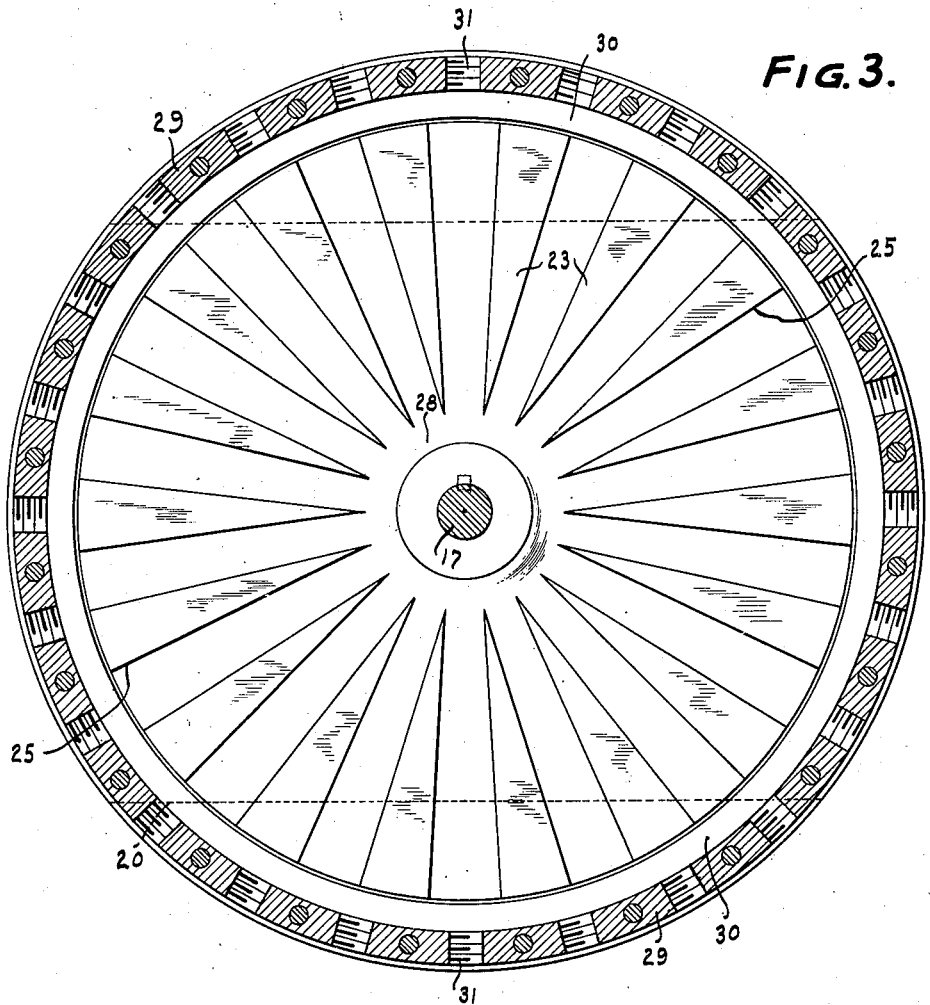
Fig. 3 is a sectional view taken along the line III—III of Fig. 1 and showing the impeller in plan.
Figure 4:
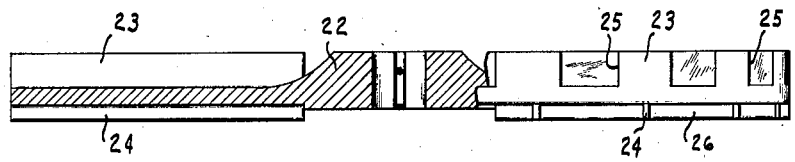
Fig. 4 is a sectional detail view of the impeller.

In the drawings, there is shown impeller apparatus, at 10, supplied with a mixture of pulverized fuel and air by suitable means, such as the pulverizing and classifying apparatus, at 11, and which is operative, while maintaining uniformity of the mixture of fuel and air, to secure equalized flow of the mixture to a plurality of nozzle-supply passages 12.

The impeller apparatus includes a casing 14 having a top or front well 15 and a bottom or back wall 16. A drive shaft 17, rotated at a suitably high speed by means, such as the motor 18, extends through the aperture 19 formed in the bottom wall and it terminates within the casing. As shown, the housing 14 and the motor 18 are carried by bracket structure 20, which cooperates with the housing bottom wall to hold sealing means 21 about the drive shaft.

An impeller 22 is attached to the upper end of the drive shaft within the casing. Preferably, the impeller is in the form of a disc and it has vanes 23 and 24 unitary with the upper and lower sides thereof. The vanes 23 have sufficiently close clearance with respect to the top wall 15 to form impeller passages 25 between adjacent vanes, whereas the vanes 24 provide radial passages 26 covered by the bottom wall. The vanes 23 and 24 terminate outwardly at the periphery of the impeller 22 and the vanes 23 terminate at their inner ends a sufficient distance from the impeller axis so that such inner vane ends and the impeller form a central impeller space 28 in open communication with the inner ends of the impeller passages 25.

The casing top and bottom walls are joined by an annular wall structure 29 providing an annular equalizing chamber 30 encompassing the impeller 22. Outwardly and radially from the impeller periphery, the wall structure 29 is provided with outlets 31 for the respective nozzle-supply passages 12. The outlets are distributed about the impeller periphery in uniformly spaced relation.

The pulverized fuel and air supply passage or conduit 32 has its outlet opening through the top wall 15 into the central or eye space 28 of the impeller so that the latter, rotating at high speed, induces flow of mixture of pulverized fuel and air thereinto from the conduit 32 at high velocity and acts on the mixture to discharge it into the annular equalizing chamber 30 for flow through the outlets 31 to the nozzle-supply passages 12.

Preferably, the impeller passages 25 and 26 are provided by slots milled in the disc.

From the foregoing, it will be apparent that I have devised apparatus for supplying a mixture of pulverized fuel and air to a plurality of nozzle passages and which employs an impeller operating to give a high in-coming velocity of pulverized fuel and air to promote uniform distribution of the coal and air and wherein the impeller is designed to have a relatively low developed pressure head. The annular equalizing chamber encompassing the impeller provides for substantially uniform division of the pulverized fuel and air stream into separate parts for the nozzles. The bottom passages 26 function as impeller passages to keep the space between the bottom wall and the impeller clear of pulverized fuel accumulations. A pulverized fuel and air mixture dividing device of this character may be constructed so as to be quite small and compact and require only a small amount of power for its operation, it being important to have a high pulverized fuel and air in-coming velocity to the impeller to promote uniformity of the mixture, to provide the impeller with an encompassing equalizing chamber to assure of equalized supply of the mixture to the nozzle supply passages and to have an impeller or runner of sufficient diameter suitable to the number of outlets for supplying pulverized fuel and air from the equalizing chamber to the passages.

While the invention has been shown in but one form, it will be obvious to those skilled in the art that it is not so limited, but is susceptible of various changes and modifications without departing from the spirit thereof.

What is claimed is:

In apparatus for distributing a mixture of pulverized fuel and air to a plurality of nozzle-supply passages, an impeller disc having vanes at opposite sides thereof defining impeller passages, an impeller housing providing an annular chamber encompassing the impeller and including opposed walls having close clearance with respect to said vanes, said chamber having circumferentially-distributed outlets for the respective passages with the outlets disposed outwardly from the impeller periphery, and a pulverized fuel and air mixture supply conduit communicating with the central portion of one side of the impeller so that the latter is effective to produce flow of mixture into the impeller at high velocity and to act on the mixture to discharge it through the vane passages at said one side into the annular chamber for flow through the outlets to the nozzle-supply passages.

FLOYD T. HAGUE.

REFERENCES CITED

The following references are of record in the file of this patent:

UNITED STATES PATENTS

| Number | Name | Date |
|---|---|---|
| 1,754,124 | Skentelbery et al. | Apr. 8, 1930 |